J. P. C. VON CARLSBERG.
STRUCTURAL JOINT.
APPLICATION FILED OCT. 24, 1917.
1,266,104.
Patented May 14, 1918.
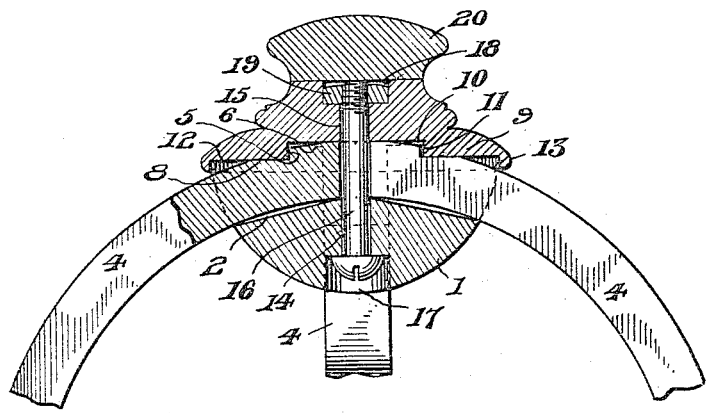
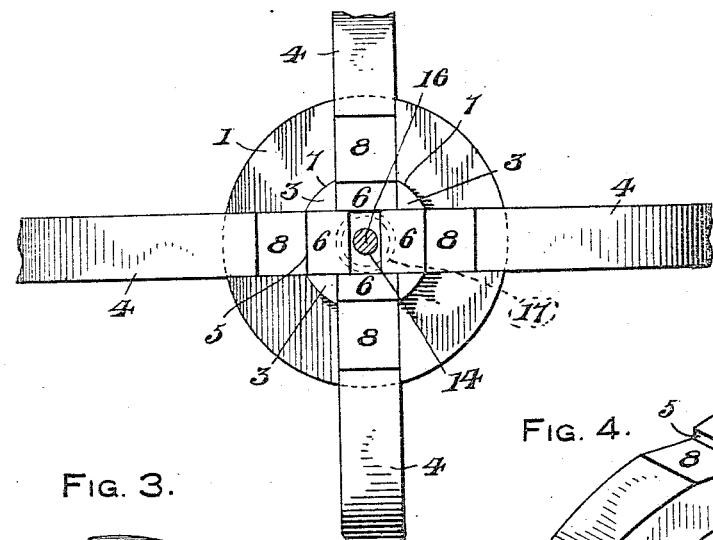

UNITED STATES PATENT OFFICE.

JOHN P. CLARY VON CARLSBERG, OF WORCESTER, MASSACHUSETTS.

STRUCTURAL JOINT.

1,266,104.  Specification of Letters Patent.  Patented May 14, 1918.

Application filed October 24, 1917. Serial No. 198,308.

*To all whom it may concern:*

Be it known that I, JOHN P. CLARY VON CARLSBERG, a citizen of the United States of America, residing at Worcester, in the county of Worcester and State of Massachusetts, have invented certain new and useful Improvements in Structural Joints, of which the following is a specification.

This invention relates to certain new and useful improvements in structural joints and is particularly designed to provide an extremely serviceable and rigid connection of the meeting ends of stand legs.

It is the especial object of the present invention to provide a joint of the above type which is simple in plan of construction and designed to give a finished appearance to a stand having legs which converge to a common meeting point.

It is a further object of the present invention to provide a multi-part coupling member designed to interlock with the meeting ends of the stand legs to secure the same rigidly in their proper relations.

With the above general objects in view and others that will become apparent as the nature of the invention is better understood, the same consists in the novel form, combination and arrangement of parts hereinafter more fully described, shown in the accompanying drawing and claimed.

In the accompanying drawing, in which like characters of reference refer to corresponding parts throughout the several views, Figure 1 is a detail fragmentary view of a portion of a stand with my improvement thereon, parts being shown in vertical section.

Fig. 2 is a plan view of Fig. 1 with the cap member removed and the bolt shown in cross section.

Fig. 3 is a perspective view of the base member of the coupling and

Fig. 4 is a perspective view of an end portion of one of the stand legs.

Referring more in detail to the several views, the present invention provides a coupling including a base member 1 which may be of any desired configuration, but which is shown herein as of general hemispherical form and formed in the upper face of the member 1 are a plurality of radial outwardly inclined slots 2. Extending upwardly from the flat upper face of the member 1 are a plurality of segmental lugs 3 which are arranged at the intersections of the slots 2 and the ends of the stand legs 4 are adapted to be positioned in said slots 2 as more clearly shown in Figs. 1 and 2 whereby the faces 5 of the lugs 6 of said legs are positioned coincident with the outer faces 7 of the lugs 3. The lugs 6 are preferably formed by cutting away a portion of the stand leg to produce a flat surface 8.

A cap member 9 of any desired ornamental form is provided and has a substantially circular central countersunk portion 10 whose surrounding wall 11 is of such dimensions as to closely fit against the faces 5 and 7 respectively of the legs 4 and lugs 3, such cap member being further countersunk to provide a flat surface 12 which rests upon the flat surfaces 8 of the legs 4. A marginal rim 13 is thus produced to fit the periphery of the base member 1. The member 1 is provided with an axial bore 14 and the cap member 9 is provided with a similar bore 15 through which is positioned the bolt 16, the head thereof being arranged in a countersunk portion 17. Concentric with the bore 15 and in the upper face of the cap member 9 is a preferably rectangular countersunk portion 18 in which is fitted the nut 19 and it is obvious that by rotating bolt 16 and thereby screwing the same into the nut 19, the parts 1 and 9 will be firmly clamped together thereby locking the legs together by reason of the fact that the lugs 6 of the legs 4 extend upwardly into the countersunk portion 10.

A finishing button 20 of any desired form is glued or otherwise secured upon the cap member 9 to thereby render the nut 19 invisible.

Obviously, this form of joint is equally as well useful in connecting more or less than four legs by adding or eliminating a corresponding number of slots or grooves and it is therefore to be understood that such variations are contemplated within the spirit and scope of the invention.

It is believed that the construction and operation of the invention will be readily understood from the above description by those skilled in the art to which it pertains and, while the form of the invention herein described and illustrated is what is believed to be the preferred embodiment of the invention, it is nevertheless to be understood that minor changes in the form, combination and arrangement of parts may be made without departing from the spirit and scope of the invention as claimed.

What I claim as new is:—

1. A structural joint including a slotted base member, a cap member interlocking therewith, joined members positioned in the slots of said base member and interlocking with the cap member to prevent separation of said joined members, and means to secure said members in interlocking relation.

2. A structural joint comprising a base member provided with radial slots in the upper face thereof and having upwardly extending lugs at the intersections of the slots, joined members positioned in said slots and provided with upwardly extending lugs coincident with the aforesaid lugs, a cap member interlocking with all of said lugs, and means to secure the members in their interlocking relation.

3. A structural joint comprising a base member provided with radial outwardly inclined slots and having upwardly extending lugs at the intersections of the slots, joined members positioned in said slots and provided with laterally extending lugs coincident with the aforesaid lugs, a cap member provided with a countersunk portion whose wall embraces all of said lugs and a bolt extending axially through said base member and said cap member and engaging a nut in one of said members to secure said base member to said cap member with the lugs of the joined members positioned in the countersunk portion of the latter member.

4. A structural joint for stand legs comprising a base member provided with radial outwardly inclined slots and having lugs extending upwardly therefrom, legs having their end portions positioned within said slots and provided with lateral lugs coincident with the lugs of said base member, a cap member provided with a substantially central countersunk portion whose wall embraces all of said lugs, said cap member having an angular countersunk portion in one face thereof, a nut positioned in said angular countersunk portion, and a bolt extending through said base and cap members and engaging said nut to secure the base member and cap member together.

5. A structural joint comprising a base member having a plurality of grooves therein, joined members having their ends positioned within said grooves, a cap member interlocking with said base member and said joined members to prevent separation of said joined members, and means to secure said cap member to said base member.

In testimony whereof I affix my signature.

JOHN P. CLARY VON CARLSBERG.

Copies of this patent may be obtained for five cents each, by addressing the "Commissioner of Patents, Washington, D. C."